(12) United States Patent
Lin et al.

(10) Patent No.: US 11,579,491 B2
(45) Date of Patent: Feb. 14, 2023

(54) REFLECTIVE DISPLAY

(71) Applicant: JRD Communication (Shenzhen) LTD., Guangdong (CN)

(72) Inventors: Ke Lin, Guangdong (CN); Yang Yu, Guangdong (CN); Zhuwei Qiu, Guangdong (CN); Ping Chen, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 17/228,758

(22) Filed: Apr. 13, 2021

(65) Prior Publication Data
US 2022/0276534 A1    Sep. 1, 2022

(30) Foreign Application Priority Data

Mar. 1, 2021  (CN) .......................... 202110227814.9

(51) Int. Cl.
| | | |
|---|---|---|
| *G02F 1/1335* | (2006.01) | |
| *F21V 8/00* | (2006.01) | |
| *G02F 1/1368* | (2006.01) | |

(52) U.S. Cl.
CPC ..... *G02F 1/133616* (2021.01); *G02B 6/0035* (2013.01); *G02B 6/0065* (2013.01);
(Continued)

(58) Field of Classification Search
CPC ......... G02F 1/133616; G02F 1/133514; G02F 1/1368; G02F 2202/28; G02F 2203/02; G02B 6/0035; G02B 6/0065
See application file for complete search history.

(56) References Cited

U.S. PATENT DOCUMENTS

| | | |
|---|---|---|
| 6,734,929 B2 | 5/2004 | Sugiura et al. |
| 8,379,172 B2 | 2/2013 | Nagata et al. |
| (Continued) | | |

FOREIGN PATENT DOCUMENTS

| | | |
|---|---|---|
| CN | 1437059 | 8/2003 |
| CN | 102037399 | 4/2011 |
| (Continued) | | |

OTHER PUBLICATIONS

International Search Report and the Written Opinion dated Nov. 29, 2021 From the International Searching Authority Re. Application No. PCT/CN2021/111476. (11 Pages).
(Continued)

*Primary Examiner* — Donald L Raleigh

(57) ABSTRACT

A reflective display includes a display, a thin-diaphragm transistor backplate, a front-light guiding module, and a front-light unit. The thin-diaphragm transistor backplate is arranged to reflect light, the front-light guiding module is located between the display and the thin-diaphragm transistor backplate, and the front-light unit is provided on the side of the front-light guiding module to irradiate the front-light guiding module. The front-light guiding module includes reflective diaphragms arranged in order along the irradiation direction of the front-light unit. The angle between a reflective diaphragm and the display is between 0 and 90 degrees. By using an array of reflective coating structures for the front-light guiding module, the present invention can better reflect the light from the front-light source to the thin-diaphragm transistor backplate, thereby increasing self-illumination of the reflective display. Therefore, the present application can significantly improve existing reflective displays without significantly increasing costs.

12 Claims, 3 Drawing Sheets

(52) U.S. Cl.
CPC ...... *G02F 1/1368* (2013.01); *G02F 1/133514* (2013.01); *G02F 2202/28* (2013.01); *G02F 2203/02* (2013.01)

(56) References Cited

U.S. PATENT DOCUMENTS

| | | |
|---|---|---|
| 9,341,883 B2 | 5/2016 | Li et al. |
| 11,143,378 B2 | 10/2021 | Kuboyama |
| 2002/0172031 A1 | 11/2002 | Masuda |
| 2009/0190072 A1 | 7/2009 | Nagata |
| 2013/0070344 A1* | 3/2013 | Takeda ................. G02B 6/0035 427/163.1 |
| 2016/0299279 A1 | 10/2016 | Uehara et al. |
| 2021/0271084 A1* | 9/2021 | Tanaka ................ G02B 27/0172 |
| 2022/0057561 A1* | 2/2022 | Leslie ................. G02B 6/0058 |

FOREIGN PATENT DOCUMENTS

| | | | |
|---|---|---|---|
| CN | 103885184 | 6/2014 | |
| CN | 104832883 | 8/2015 | |
| CN | 105929545 | 9/2016 | |
| CN | 110349501 | 10/2019 | |
| CN | 112987401 | 6/2021 | |
| WO | WO 2009/084052 | 7/2009 | |
| WO | WO-2020146313 A1 * | 7/2020 | ........... G02B 6/0036 |

OTHER PUBLICATIONS

European Search Report and the European Search Opinion dated Aug. 16, 2021 From the European Patent Office Re. Application No. 21163425.8. (8 Pages).

* cited by examiner

REFLECTIVE DISPLAY

CROSS REFERENCE TO RELATED APPLICATIONS

This application claims the priority of the Chinese Patent Application No. 202110227814.9, filed on Mar. 1, 2021 and incorporated herein by reference.

TECHNICAL FIELD OF INVENTION

The present application relates to the field of display technology, and more particularly to a reflective display suitable for terminal devices.

BACKGROUND OF INVENTION

With continuous development of communication technologies, terminal products such as smartphones, tablet and laptops have become essential for the daily life. The terminal products are developed with increased diversification and personalization, and people can work and entertain through terminal devices, such as obtaining the latest news from browsing the terminal devices. The electronic devices are equipped with displays, such as a liquid crystal display (LCD), active-matrix organic light-emitting diode (AMO-LED) display, etc. LCDs, AMOLED displays and other displays require a backlight or self-luminous light source to light up, and the blue light from the light source is harmful to human eyes. As people more heavily use smartphones, tablets and other display products, the incidence of cataracts, macular degeneration, and other eye diseases is increasing. Blue light in the visible light spectrum (e.g., light with a wavelength between 410 and 470 nm) has the greatest negative impact on the eyes. Generally speaking, blue light could harm to human eyes in the following ways:
(1) Increased risk of cataracts: when eyes are exposed to high-energy short-wave blue light with the wavelengths of 410-470 nm, the lens of eyes will absorb part of the blue light and gradually cloud up to form a cataract, and most of the remaining blue light will penetrate the lens and reach the retina to increase the macular toxin in the macula, which will more easily lead to macular degeneration or cataract.
(2) Increased visual fatigue: due to the short wavelength of blue light, the focus does not fall on the center of the retina, but a little more forward from the retina. To see more clearly, the eyes will be under tension for a long time, thereby causing visual fatigue. Long-term visual fatigue may lead to the deepening of nearsightedness, double vision when looking at things, viewing wrong lines or paragraphs upon reading, inability to concentrate, blurred vision when working at a close range and other symptoms, affecting learning and working efficiency.
(3) Causing insomnia: when entering the sleep state at night, the brain secretes melatonin to help sleep, which can help recover from fatigue and even eliminate cancer cells. But blue light to some extent inhibits the secretion of melatonin, thus affecting the quality of sleep or even stop a person from sleeping. This may also be the reason why one might be unable to sleep if he or she has played a tablet or smartphone before going to bed, it.

In the process of research and practice of prior art techniques, the inventor of the present application embodiment found that, in order to provide users with a more comfortable reading experience, most of the display manufacturers have introduced a display that does not require a backlight or self-luminous light as the way of providing light, that is, the reflective liquid crystal display (RLCD), whose luminous principle is to coat a layer of reflective coating in the display, and fulfill the purpose of generating light through reflecting the external light.

However, the reflective display is not able to emit light, but relies on reflecting the external ambient light to help present images. The terminal devices based on such kind of screen design can well protect the eyesight. However, when a terminal with a reflective display is not illuminated by the external light, the screen cannot properly display the content for users to read, which is not convenient for users to read and thereby lowering the reading experience. Therefore, when the ambient light is weak, it is necessary to add a front-light unit as a solution.

More precisely, the reflective display is a kind of display without using the backlight, but directly use the reflection of ambient light as the screen light source. Reflective displays can be categorized into passive reflective displays and active reflective displays according to the presence or absence of an auxiliary light source. The principle of the passive reflective display to present images is to coat a layer of reflective material on the bottom of the LCD panel to reflect the ambient light. Under a proper ambient light source, the passive reflective display not only has a better display effect, but also can reduce the power consumption to achieve the overall power saving for the product. However, when the ambient light conditions are poor, the passive reflective display will be less ideal due to the reduction of reflected light. In order to solve this problem, the active reflective display technology which further uses an auxiliary light source is proposed. An active reflective display is equivalent to adding a light source to the top of a passive reflective display, so that the screen can be seen clearly even when the ambient light is dim.

The current front-lights basically adopt a light emitting diode (LED) with the light guide plate, so as to downward reflect by converting the light from the LED through the dot pattern provided on the top of the light guide plate, and provide upward light emission through the aforementioned front-light unit provided on the side when in the nighttime or in a dark room, in order to allow users to clearly read even when the external night is insufficient. However, there is still much room to improve the brightness and uniformity of the illumination.

SUMMARY OF INVENTION

The present invention provides a lateral array structure of a reflective display based on a reflection principle. The lateral array structure comprises a plurality of reflective diaphragms arranged in the irradiating direction, so that light can be ultimately reflected towards the reflective display, thereby further increasing the self-illumination effect of the reflective display.

This application provides a reflective display for a terminal device. the reflective display comprises a display, a thin-diaphragm transistor backplate, a front-light guiding module, and a front-light unit. The thin-diaphragm transistor backplate is arranged to reflect light, the front-light guiding module is located between the display and the thin-diaphragm transistor backplate, and the front-light unit is provided on the side of the front-light guiding module to irradiate the front-light guiding module. The front-light guiding module comprises a plurality of reflective diaphragms arranged in order along the irradiating direction of the front-light unit, wherein the plurality of the reflective diaphragms are at an angle of 0 degrees to 90 degrees from the display.

Alternatively, in some embodiments of the present application, the angles between the plurality of the reflective diaphragms and the display panel are not same to one another.

Alternatively, in some embodiments of the present application, the angles between the plurality of the reflective diaphragms and the display panel are same to one another.

Alternatively, in some embodiments of the present application, the angles between the plurality of the reflective diaphragms and the display panel are 45 degrees.

Alternatively, in some embodiments of the present application, the plurality of reflective diaphragms are spaced at predetermined intervals from each other.

Alternatively, in some embodiments of the present application, the plurality of reflective diaphragms is composed of a metal compound.

Alternatively, in some embodiments of the present application, the metal compound is transparent.

Alternatively, in some embodiments of the present application, 5. The reflective display of claim 1, wherein the plurality of reflective diaphragms are spaced a predetermined distance apart from each other, and the predetermined distance conforms to the following equation:

$$D > 0.2L \cos \theta$$

where D represents the predetermined distance, L represents the length of each of the reflective diaphragms, and θ represents the angle between each of the reflective diaphragms and the display panel.

Alternatively, in some embodiments of the present application, wherein each of the reflective diaphragms has a vertical height, and the vertical height conforms to the following equation:

$$0.5H < L \sin \theta < 0.9H$$

where H represents the height of the front-light guiding module, L represents the length of the reflective diaphragm, and θ represents the angle between each of the reflective diaphragms and the display panel.

Alternatively, in some embodiments of the present application, the front-light guiding module comprises polymethylmethacrylate (PMMA) or polycarbonate (PC).

Alternatively, in some embodiments of the present application, the front-light guiding module comprises a plurality of recesses for accommodating the plurality of reflective diaphragms, respectively.

Alternatively, in some embodiments of the present application, the front-light guiding module comprises a plurality of sub-blocks and the plurality of reflective diaphragms, and the plurality of the sub-blocks and the plurality of the reflective diaphragms are arranged in an interlaced manner.

Alternatively, in some embodiments of the present application, the front-light unit is a light emitting diode (LED).

Alternatively, in some embodiments of the present application, the reflective display further comprises a color filter layer and a second optical adhesive layer. The color filter layer is located between the front-light guiding module and the diaphragm transistor backplate, and the second optical adhesive layer is located between the color filter layer and the diaphragm transistor backplate.

Alternatively, in some embodiments of the present application, the material of the first optical adhesive layer and the second optical adhesive layer is optical clear adhesive (OCA) or optical clear resin (OCR).

Alternatively, in some embodiments of the present application, the display is a smartphone, a tablet or a laptop computer.

Alternatively, in some embodiments of the present application, the display is a touch panel.

To summarize, the present application effectively solves the problems encountered in prior art techniques through the above novel solutions without significantly increasing the cost. Hence, the present application can well improve the efficiency of the reflective display in an economic way, and thereby provides a better user experience.

BRIEF DESCRIPTION OF DRAWINGS

In order to illustrate the technical solutions more clearly in the embodiments of the present application, the following embodiments will be described using the attached drawings. It is obvious that the following descriptions of the attached drawings merely represent some of the embodiments of the present application. To one skilled in the art, some potential drawings can be generated according to the drawings of the present application without any creative effort.

DETAILED DESCRIPTION OF INVENTION

Figure 1:
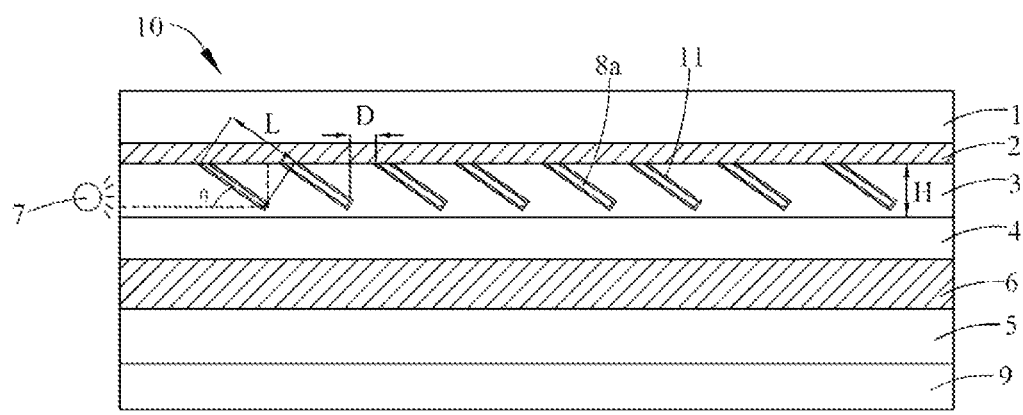
FIG. 1 is a schematic diagram of a reflective display according to an embodiment of the present application.

The following embodiments are described with reference to the attached drawings to exemplify particular embodiments in which the present application may be implemented. Some terms used in the present application, e.g. "left", "right", "inside," "outside," "side," etc., should be referenced with the directions shown in the drawings. Accordingly, these directional terms are intended to help illustrate and understand the present application, and are not intended to limit the scope of the present application.

Following examples are used to describe the present invention, but they are only for illustrative objectives. Those skilled in the art may readily observe that various modifications and alterations of the device and method may be made without departing from the spirit and the scope of the invention. Hence, the claimed scope of the present disclosure should be based on the claims defined hereinafter. Throughout specification and the claims, except for those further defined in the content, the meaning of the terms "a" and "the" may include the meaning of "one or at least one" element or component. Moreover, throughout the specification and claims, the singular terms may also refer to plural elements or components, unless the context clearly specifies that the plural usage is excluded. In the whole specification and claims, unless the content clearly specifies the meaning of some terms, the meaning of the term "wherein" includes the meaning of in/on something/somewhere". The meaning of each term used in the present claims and specification refers to a usual meaning known to one skilled in the art unless the meaning is additionally annotated. Some terms used to describe the present invention will be discussed to guide practitioners to realize the present invention. Further, various embodiments in the specification in are not meant to limit the claimed scope of the present invention.

The terms "substantially," "around," "about" and "approximately" can refer to a predetermined value, or a value difference within 20% or preferably within 10%. In addition, the quantities provided herein can be approximate, such that the terms "around," "about" and "approximately" cab be used if the value or range is not further specified. When a quantity, density, or other values or parameters has a designated range, better range or listed ideal values, it should be viewed as including the range with any upper/lower limit or a same value, no matter the range is disclosed or not. For example, if it is described that the length of a component is X cm to Y cm, it is equivalent to the sentence "the length of the component is H cm, in which H can be any real number between X and Y."

In addition, the term "electrically connected" can refer to either directly connections or indirectly connections between elements. Hence, if it is described in the contents of the present invention below that a first device is electrically coupled to a second device, the first device can be either directly connected to the second device, or indirectly connected to the second device through other devices or means. Moreover, as far as the transmissions or generations of electrical signals are mentioned, one skilled in the art should understand some degradations or unwanted transformations could be generated during the operations. However, if it is not specified in the specification, an electrical signal at the transmitting end should be viewed as substantially the same as that at the receiving end. For example, when the end A of an electrical circuit provides an electrical signal S to the end B of the electrical circuit, the voltage of the electrical signal S may drop due to passing through the source and drain of a transistor or due to some possible parasitic capacitance. However, the objective of this design is not meant to achieve some specific technical effects by deliberately using the degradation generated during the transmission. The electrical signals S at the end A should be viewed as substantially the same as that at the end B.

Furthermore, it can be understood that the terms "comprising," "including," "having," "containing," and "involving" are open-ended terms, which refer to "may include but is not limited to." In addition, each of the embodiments or claims of the present invention is not necessary to achieve all possible advantages and features. Further, the abstract and title of the present invention is used to assist the patent searching, rather than limiting the claimed scope of the present invention.

The following will be a clear and complete description of the technical solutions in the embodiments of the present application in conjunction with the accompanying drawings in the embodiments of the present application. Obviously, the described embodiments are only a part of the embodiments of the present application, rather than all of them. Based on the embodiments in the present application, all other modifications made by one skilled in the art without making creative efforts shall fall within the scope of the present application. Furthermore, it should be understood that the specific embodiments described here are merely intended to illustrate and explain the present application and are not intended to limit the scope of the present application. In the present application, if contrary circumstances are not stated, the directional terms "up" and "down" usually refer to the actual use or working condition of the device, especially the directions shown in the attached drawings, while the terms "inside" and "outside" refer to the outlook of the device.

Please refer to the attached drawings, wherein the same component symbols represent the same components. The following description is based on specific embodiments exemplified in the present application. These embodiments, however, are not intended to limit other embodiments of the invention that are not illustrated in detail.

Referring to FIG. 1, FIG. 1 is a schematic diagram of a reflective display 10 according to an embodiment of the present invention. As shown in FIG. 1, the reflective display 10 includes a display 1, a first optical adhesive layer 2, a front-light guiding module 3, a polarizing layer 4, a second optical adhesive layer 5, a color filter layer 6, a front-light unit 7, and a diaphragm transistor (TFT) backplate 9. The display 1, the first optical adhesive layer 2, the front-light guiding module 3, the polarizing layer 4, the color filter layer 6, the second optical adhesive layer 5, the front-light unit 7, and the diaphragm transistor backplate 9 are stacked sequentially from top to bottom. The front-light guiding module 3 has a reflective coating 8a sequentially arranged along the irradiating direction of the front-light unit 7. The diaphragm transistor backplate 9 is arranged to reflect light, the front-light guiding module 3 is located between the display 1 and the diaphragm transistor backplate 9, and the front-light unit 7 is provided on one side of the front-light guiding module 3 to irradiate the front-light guiding module 3.

Alternatively, in some embodiments of the present application, the material of the first optical adhesive layer 2 and the second optical adhesive layer 5 may be an optical adhesive (OCA) or an optical clear resin (OCR). In some embodiments of the present application, the reflective display 10 may be a smartphone, a tablet, or a notebook computer, and the display 1 may be a touch panel or a non-touch panel of the device.

The front-light guiding module 3 comprises a plurality of reflective diaphragms 8a arranged sequentially along the irradiation direction of the front-light unit 7, wherein the angle θ between the reflective diaphragms 8a and the display 1 is between 0 and 90 degrees. Alternatively, in some embodiments of the present application, the angles between the reflective diaphragms 8a and the display 1 are same to each other. Alternatively, these angles may also be designed to be not same according to actual design requirements. In a preferred embodiment of the present application, the angle θ between the reflective diaphragm and the display 8a is 45 degrees, which provides a better downward reflection effect, but the present invention does not limit the size of the angle in particular. As long as the reflective diaphragms 8a are not completely parallel to the front-light guiding module 3 or not completely perpendicular to the front-light guiding module 3, it is theoretically possible to convert the laterally transmitted light into downward transmitted light to the diaphragm transistor backplate 9. Under this premise, an angle of 45 degrees arguably provides better light reflection effects, but an angle of between 30 and 60 degrees should still be able to achieve similar results.

Any two adjacent reflective diaphragms 8a are separated by a predetermined distance D. All reflective diaphragms 8a can be designed to have same or different predetermined distances. For example, when the number of the reflective diaphragms 8a is increased to enhance the reflective effect, if two adjacent reflective diaphragms 8a are too close to each other, the light from above the display 1 will be blocked, affecting the illumination effect achieved using the natural ambient light. In this case, θ can be increased from 45 degrees (to 60 degrees or more, for example) to reduce the shading effect casted on the light above the display 1. In general, there is no limitation on the number, spacing, and the angle of the reflective diaphragms 8a. These factors can be decided based on actual design considerations.

Alternatively, in some embodiments of the present application, the plurality of reflective diaphragms are spaced a predetermined distance apart from each other, the predetermined distance may conform to the following equation:

$$D > 0.2L \cos \theta$$

where L represents the length of each of the reflective diaphragms. The above conditions are merely a preferred embodiment of the present invention, rather than a limitation of the scope of the present invention.

In addition, in some embodiments of the present application, the vertical height of each of the reflective diaphragms may conform to the following equation:

$$0.5H < L \sin \theta < 0.9H$$

where H represents the height/thickness of the front-light guiding module 3. The above condition is merely illustrated as a preferred embodiment of the present invention, rather than a limitation of the scope of the present invention.

Alternatively, in some embodiments of the present application, the reflective diaphragms 8a may be composed of a metal compound, but the present invention is not limited thereto. In another example, the reflective diaphragms 8a may also be composed of pure metal or non-metal material. In addition, the present invention does not limit the conductive properties of the reflective diaphragm 8a, that is, the reflective diaphragm 8a may be either conductive or not conductive (e.g. insulating). For example, the reflective diaphragm 8a can be transparent-conductive diaphragm material, which may provide more than 80% light transmission in the visible light range (the wavelength from 380 to 780 nm), and the resistance thereof can be less than $1 \times 10^{-3}$ Ωcm. In response to the process requirements, due to having both transparent and conductive properties, the transparent-conductive diaphragms have been widely applied and the demand of the transparent-conductive diaphragms is also increasing in recent years. The materials used to manufacture transparent-conductive diaphragms can be roughly classified into following two categories, which are thin metal diaphragms and metal oxide diaphragms.

1. Thin Metal Diaphragm:

As the metal material conducts electricity, the thin metal diaphragm is a good infrared reflector which can also reflect visible light. The concentration of its free carrier is about $10^{23}$ cm$^{-3}$, so that the plasma frequency of the metal falls in the ultraviolet region and therefore is non-transparent in the visible light region. However, as long as the thickness of the metal diaphragm is small enough, i.e., a thin metal diaphragm (such as gold, silver, copper, platinum and other diaphragms), it can also provide a certain extent of transparency. To increase the transparency in the visible light region while maintaining strong reflectivity in the infrared region, the metal must be made into a thin film, preferably with a thickness of less than 10 nm. Theoretically, a thin metal film is a good transparent-conductive film.

2. Metal Oxide Semiconductor Diaphragm:

As for the transparent conducting oxide (TCO), for example, a diaphragm of cadmium metal (Cd) are transparent and conductive after oxidation is performed. In order to obtain transparency in the visible region, the energy gap width of the chosen material must be greater than the energy of visible light, i.e., it must be greater than 3.0 eV or more. This kind of pure material is not conductive (e.g. insulating) at room temperature. In order to increase its electrical conductivity, doping some impurities to improve its electrical properties is a common approach. The doping can be categorized in following two ways:

(1) Doping with metal ions with one more valence than the cation of the original compound, such as ITO (In2O3:SnO2) diaphragm formed by doping Tin into Indium oxide, ATO (Sb2O3:SnO2) diaphragm formed by doping Antimony into Tin oxide, or non-metal ions with one less valence than its anion, such as FTO (F2:SnO2) diaphragm formed by adding Fluorine gas into Tin oxide.

(2) Manufacturing nonstoichiometric semiconductor compounds (i.e., semiconductors containing anionic vacancies).

Both of the above-mentioned doping methods can effectively improve the electrical conductivity of the diaphragm, for such transparent-conductive diaphragms, its properties and doping ions have a close relationship. It means that the oxidation state of the diaphragm and the quality and quantity of impurity ions doping must be controlled to obtain a good transparent-conductive diaphragm. Representative TCO materials may include: Indium oxide (In2O3), Tin oxide (SnO2), Zinc oxide (ZnO), Cadmium oxide (CdO), Indium Cadmium oxide (CdIn2O4), Cadmium Tin oxide (Cd2SnO4), Tin Zinc oxide (Zn2SnO4) and Indium oxide doped Zinc oxide (In2O3-ZnO), and so on. The energy gaps of these oxide semiconductors are above 3.0 eV, so the energy of visible light (about 1.6-3.3 eV) is not enough to excite the electrons in the valence band to the conduction band, and only light with the wavelength below 350-400 nm (e.g., ultraviolet light) is possible. In2O3, SnO2 and ZnO are three most widely used transparent-conductive diaphragm materials, of which ITO diaphragms are often used as transparent electrode materials in flat panel displays, and have become crucial transparent-conductive diaphragm materials in recent years with the popularity of flat panel displays. In addition, Aluminum-doped Zinc oxide (ZnO:Al, AZO) is considered to have the most potential to replace ITO.

In the embodiment of FIG. 1, the front-light guiding module 3 includes multiple recesses 11 to accommodate the reflective diaphragms 8a respectively, which can be preserved in the process before the reflective material is embedded in the recesses 11.

Figure 2:
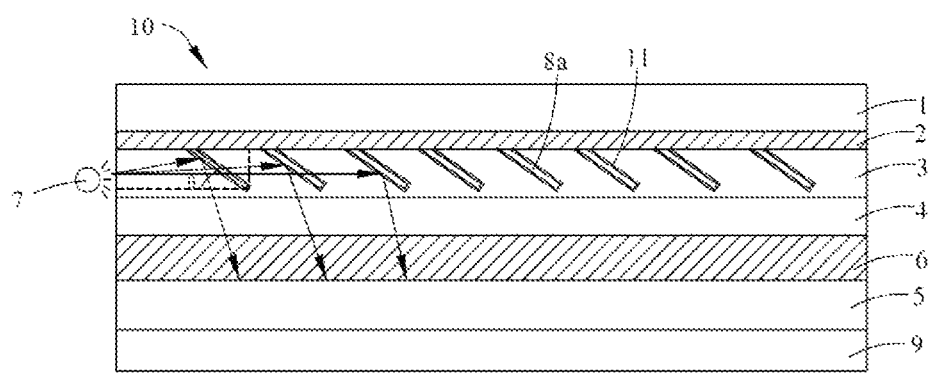
FIG. 2 is a schematic diagram of the reflective display in FIG. 1 performing reflection on the light source.

Referring further to FIG. 2, FIG. 2 is a schematic diagram of the reflective display 10 in FIG. 1 for light source reflection. As indicated by the arrows in FIG. 2, the light emitted from the front-light unit 7 enters the light guide and is reflected downward by the reflective coating 8a into the desired light shining downward to the thin-diaphragm transistor backplate 9 which further reflects the light source, resulting in a visually better brightness for the user viewing the device.

Alternatively, in some embodiments of the present application, the front-light unit is a light emitting diode (LED). The front-light unit 7 is used in conjunction with a reflective display to provide sufficient light for the display to show the picture. In addition to reflecting through the reflective coating 8a to achieve the effect of increased brightness, the front-light unit is further paired with an optical structure on the front-light guiding module 3 to form a composite front-light guiding module internal total reflection. The optical structure can be of various forms, such as a dot structure on the top of the front-light guiding module 3 or a prism structure as the optical structure for achieving total reflection. The dot structure can be mainly divided into printed and non-printed types, where the printed type means that the dot is printed on the reflective surface after the front-light guiding module 3 has gone through the shaping process. The non-printed type means that the dot will be directly formed on the reflective surface when forming the front-light guiding module 3. The formation of dot structure can be divided into chemical etching, precision mechanical engraving method (V-cut), stamper process, internal diffusion, and other methods. Through the size, distribution, regularity and irregularity of the dot, the present invention can achieve the purpose of changing the display effect. In addition, the present invention does not particularly limit the form of the dot structure and its production method.

Alternatively, in some embodiments of the present application, the material for making the front-light guiding module 3 may be polymethylmethacrylate (PMMA). Polymethylmethacrylate has a refractive index of 1.49, but the present invention is not limited thereto. Other materials with different refractive indices may also be used as the material for the front-light guiding module 3. Polymethyl methacrylate, also known as acrylic or organic glass, has the advantages of higher transparency, lower price, and easy mechanical processing, and is often used as a replacement for glass. Polymethyl methacrylate also has high light-transmissive properties. The following is the highlights of the light transmission performance of polymethyl methacrylate relative to different wavelengths of light:

(1) For visible light, polymethyl methacrylate is the best polymer transparent material at present, with light transmission rate of 92%, which is higher than that of glass.
(2) For UV light, quartz which is much pricier can completely filter the UV light, whereas the ordinary glass only let 0.6% of the UV light pass through. In contrast, polymethyl methacrylate can effectively filter UV light at wavelengths less than 300 nm. On the other hand, polymethyl methacrylate has better stability compared to polycarbonate under UV exposure.
(3) For infrared (IR) light, polymethyl methacrylate allows the passage of infrared light at wavelengths less than 2800 nm. In addition, special colors of polymethyl methacrylate allow specific wavelengths of IR to pass through while blocking visible light (for applications such as remote control or thermal sensing).

In addition to the above properties, polymethyl methacrylate has a lower density than glass. The density of polymethyl methacrylate is about 1.15-1.19 g/cm3, which is about half of that of glass (2.40-2.80 g/cm3). Polymethyl methacrylate has high mechanical strength. With a relative molecular mass of about 2 million, polymethyl methacrylate is a polymer with long chains, and the chains forming the molecules are very soft, thus the strength of polymethyl methacrylate is relatively high, and the resistance to stretching and impact is 7-18 times higher than that of ordinary glass. In addition, polymethyl methacrylate has a low melting point of about 130 to 140° C., which is much lower than the melting point of glass of about 1000 degrees.

In addition to polymethyl methacrylate, the front-light guiding module 3 can also be used polycarbonate (Polycarbonate, PC). Polycarbonate is chemically resistant to acids, oils, ultraviolet rays, and strong alkalis, while the physical properties of the polycarbonate is colorless and transparent, heat resistant, impact resistant, and flame retardant. In addition, Polycarbonate has good mechanical properties within ordinary use temperatures. Compared with polymethyl methacrylate, which has similar performance, polycarbonate has better impact resistance and higher refractive index. Polycarbonate has high light transmission, high refractive index, high impact resistance, dimensional stability and easy processing and molding, etc., and occupies an important position in the optical field. Optical lenses made of optical grade polycarbonate can be used not only for cameras, microscopes, telescopes and optical test instruments, but also for lenses of diaphragm projectors, lenses of copy machines, lenses of infrared auto-focus projectors, lenses of laser beam printers, as well as for various prisms, multi-surface mirrors, and many other office equipment and home appliances. Therefore, Optical lenses made of optical grade polycarbonate have a wide range of applications.

Alternatively, in some embodiments of the present application, the material of the first optical adhesive layer 2 and the second optical adhesive layer 5 is an optical adhesive or optical clear resin (OCR).

As to the color filter layer 6, generally speaking, color filters are the key components to colorize LCDs, since the color filter allows high grayscale black-and-white LCD to reach full color (Full Color), which means also plays a very important role in the manufacture of LCDs. The main components of color filters include glass substrate, black matrix, color photoresist, protective diaphragm and ITO conductive diaphragm. The glass used for TFT-LCD color filters is alkaline-free and low expansion glass to meet the requirements of high yield in the production process.

Alternatively, in some embodiments of the present application, the display 1 is the screen of electronic devices such as smartphones, tablets and laptops, but the present application is not limited to this. The inventive concept of the present application may also be extended to electronic devices. To be more precise, although the above embodiment of the present application is only illustrated by reflective displays, the light source reflection method of the present application can also be adopted by other electronic screen products, such as electronic paper panel devices. The refresh of the electronic paper display is discontinuous, and the present graphics can be maintained after each refresh. Even if the battery is dead, the electronic paper display will keep displaying the last picture, and that is because it has a bistable hysteresis effect, so even if the battery is dead, the picture does not return to the original state nor enter a random chaotic state, but remains in the last state. In general, the active reflective display technology of the embodiment of the present invention differs from the electronic paper display generally as follows.

(1) Compared with LCD displays, the e-paper display does not have to be constantly refreshed for displaying the content, which reduces power consumption and radiation.
(2) Whether it is a smartphone or a computer, the multimedia content to be displayed on is very rich, and the pop-up menus, window scrolling, and other operations could be shown at the same time. As a result, the refresh rate of the e-paper display is obviously insufficient to meet such requirements. Compared with LCD displays, e-paper displays are more suitable for simple content, less changeable text display.

Figure 3:
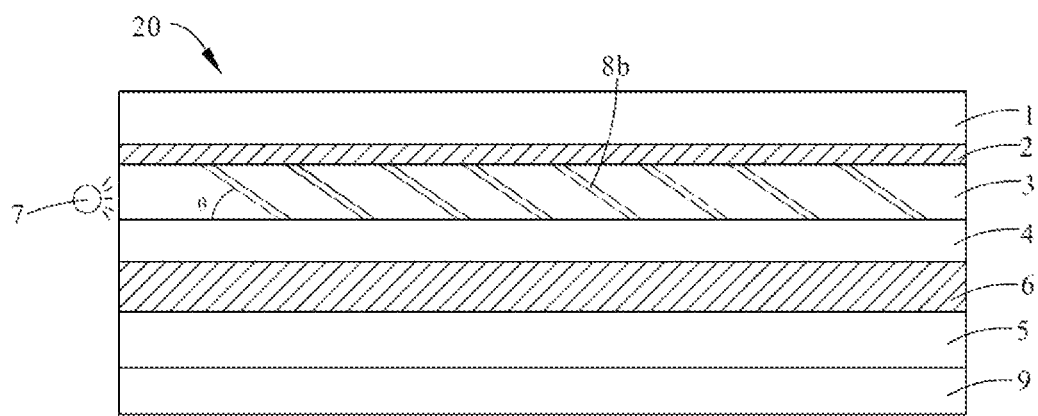
FIG. 3 is a schematic diagram of a reflective display according to another embodiment of the present application.

FIG. 3 is a schematic diagram of a reflective display 20 according to another embodiment of the present application. As shown in FIG. 3, the front-light guiding module 3 of the reflective display 20 is composed of multiple sub-blocks and reflective diaphragms 8b, which are arranged in an interlocking manner. Based on the structural differences, the process of the reflective display 20 is also different from that of the reflective display 10. For example, since each of the reflective diaphragm 8b occupies the entire cross-section of the front-light guiding module 3, each sub-block can be coated with a layer of reflective diaphragm in advance, and then all sub-blocks can be stitched together to form the entire front-light guiding module 3. Since the material choices and optical effects of the reflective display 20 are similar to those of the reflective display 10, the details description thereof is omitted here for brevity.

In summary, through the above novel embodiments, the present application is able to effectively solve the problems encountered in related art techniques without significantly increasing the cost, which thereby well improves the effectiveness of the reflective display and provides better user experience in an economic way. More specifically, the present invention adopts an array-type coating structure on the front-light guiding plate, which well enhances the reflection effect of the light source, so that the front-light unit design of the present invention can provide users with good reading experience.

In addition, the terminal product using the present invention has the advantages of thin and light body and low power consumption (compared to traditional LCD products), and the active reflective display technology also reduces the traditional backlight structure, which not only reduces the weight and thickness of the module, but also greatly reduces the power consumption of the display. Compared with general display products, reflective display products can reduce the overall product thickness by about 35% or more, and reduce the overall product weight by 40% or more. In addition, because the active reflective display solution of the present invention has no backlight structure, the overall power consumption can be reduced by 60% or even to 90% when the LED it adopted as the front-light unit.

In addition, since the light source used in the reflective display technology of the present invention comes mainly from the reflected ambient light or front-light, the blue-light hazard is lower compared to conventional products. In addition, as backlight and OLED displays are difficult to read under direct sunlight, the reflective display technology is not highly impacted by sunlight through the principle of reflecting ambient light, and the design with its own front-light unit can provide decent reading experience even in darker environments. On the other hand, the power-saving effect of the reflective display technology of the present invention can realize products such as ultra-sustainable mobile devices or low power-consumption electronic advertisement boards.

In the above embodiments, the description of each embodiment has its own focus, and what is not described in detail in a particular embodiment can be found in the relevant description of other embodiments. The embodiments described above are only part of the embodiments of the present application, not all of them. Modifications made based on the embodiments of the present application by one skilled in the art without creative efforts shall also fall within the scope of the present application.

The above embodiments of the present application provide a detailed description of the reflective display for terminal devices, and specific examples are applied in this application to illustrate the principles and implementation of the present application. The above embodiments are described only to help understand the technical solution of the present application and its core ideas. A person of ordinary skill in the art should understand that it is still possible to modify the technical solutions recorded in the preceding embodiments, or to make equivalent substitutions for some of the technical features, and these modifications or substitutions do not make the essence of the corresponding technical solutions out of the scope of the technical solutions of the embodiments of the present application.

In view of the above, although the present invention has been disclosed with the preferred embodiment as above, the above preferred embodiment is not intended to limit the scope of the present invention, and one skilled in the art may make various changes and embellishments without departing from the spirit and scope of the present invention. Hence, the scope of protection of the present invention is subject to the scope defined by the claims.

The above embodiment of the present application provides a detailed description of the reflective display applicable to terminal devices, and specific examples are applied in this paper to illustrate the principles and implementation of the present application. The above embodiment description is only used to help understand the method of the present application and its core ideas. Further, one skilled in the art can change or modify the above embodiments based on the main ideas of the present invention. Therefore, the exemplary contents in the specification should not be realized as a limitation of the scope of the present application.

What is claimed is:

1. A reflective display, comprising:
a display panel;
a thin-diaphragm transistor backplate arranged to reflect light;
a front-light guiding module disposed between the display panel and the thin-diaphragm transistor backplate; and
a front-light unit provided on a side of the front-light guiding module, the front-light unit arranged to irradiate the front-light guiding module;
wherein the front-light guiding module comprises a plurality of reflective diaphragms arranged sequentially in the irradiating direction of the front-light unit, wherein angles between the plurality of the reflective diaphragms and the display panel are between 0 and 90 degrees, and
wherein the reflective display further comprises a color filter layer and a second optical adhesive layer; the color filter layer is located between the front-light guiding module and the diaphragm transistor backplate, and the second optical adhesive layer is located between the color filter layer and the diaphragm transistor backplate.

2. The reflective display of claim 1, wherein the front-light unit is a light emitting diode (LED).

3. The reflective display of claim 1, wherein the angles between the plurality of the reflective diaphragms and the display panel are the same.

4. The reflective display of claim 1, wherein the angles between the plurality of the reflective diaphragms and the display panel are 45 degrees.

5. The reflective display of claim 1, wherein the plurality of reflective diaphragms are spaced a predetermined distance apart from each other, and the predetermined distance conforms to the following equation:

$$D > 0.2L \cos\theta$$

where D represents the predetermined distance, L represents a length of each of the reflective diaphragms, and θ represents an angle between each of the reflective diaphragms and the display panel.

6. The reflective display of claim 1, wherein each of the reflective diaphragms has a vertical height, and the vertical height conforms to the following equation:

$$0.5H < L \sin\theta < 0.9H$$

where H represents a height of the front-light guiding module, L represents a length of the reflective diaphragm, and θ represents an angle between each of the reflective diaphragms and the display panel.

7. The reflective display of claim 1, wherein each of the reflective diaphragms is composed of a metal compound.

8. The reflective display of claim 1, wherein the front-light guiding module is composed of polymethylmethacrylate (PMMA) or polycarbonate (PC).

9. The reflective display of claim 1, wherein the front-light guiding module comprises a plurality of respective recesses for accommodating the plurality of reflective diaphragms.

10. The reflective display of claim 1, wherein the front-light guiding module comprises a plurality of sub-blocks and the plurality of reflective diaphragms, and the plurality of the sub-blocks and the plurality of the reflective diaphragms are arranged in an interlaced manner.

11. The reflective display of claim 1, wherein the plurality of reflective diaphragms are spaced at predetermined intervals from each other.

12. The reflective display of claim 1, wherein the metal compound is transparent.

* * * * *